May 17, 1949.  B. D. STEVENSON  2,470,730
PLOW CONTROL
Filed July 9, 1945  2 Sheets-Sheet 1
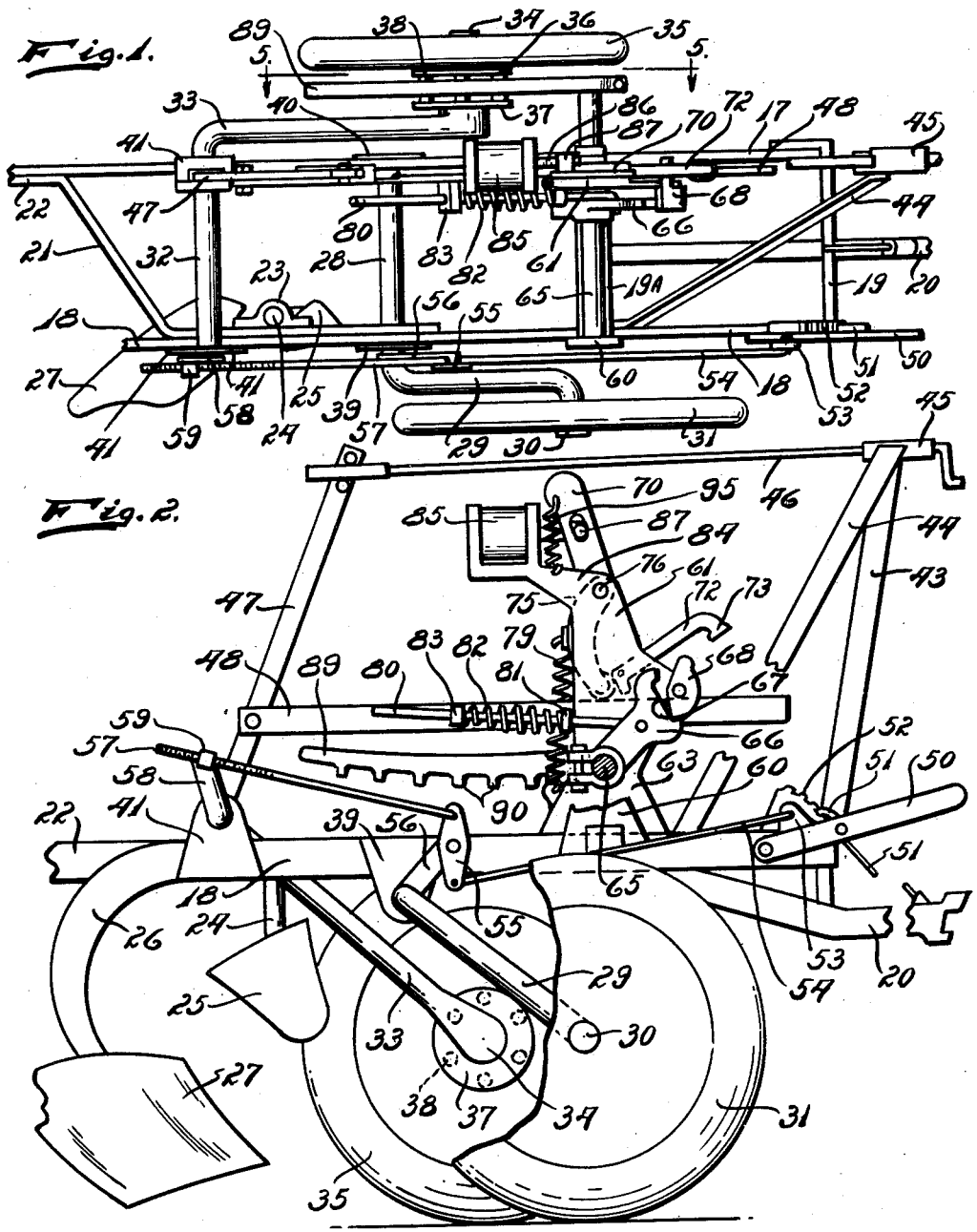
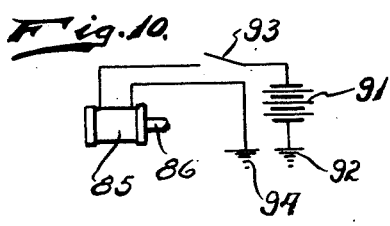
INVENTOR.
BENJAMIN D. STEVENSON
BY
ATTORNEY

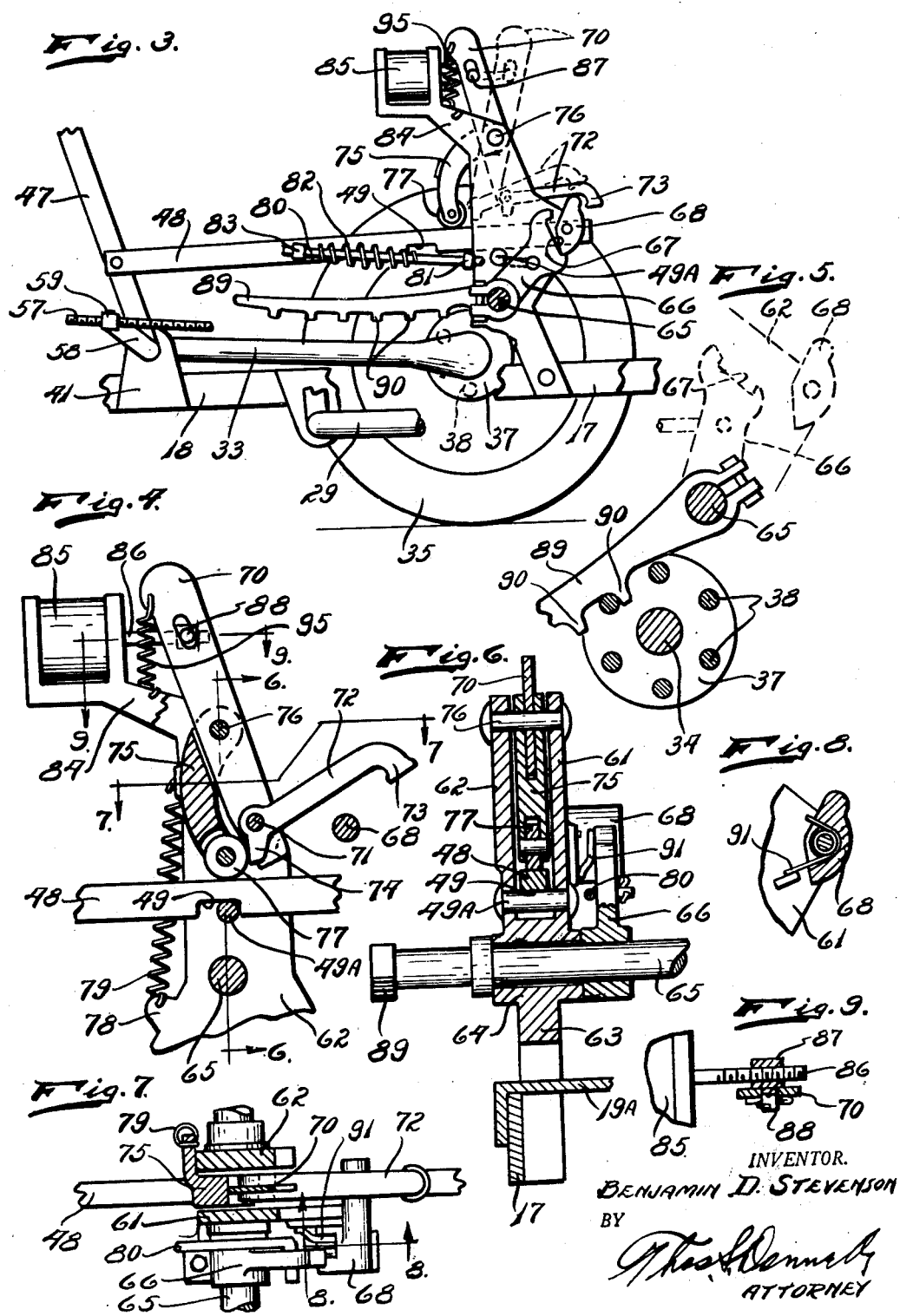

Patented May 17, 1949

2,470,730

UNITED STATES PATENT OFFICE 2,470,730

PLOW CONTROL

Benjamin D. Stevenson, Flushing, Mich.

Application July 9, 1945, Serial No. 603,824

1 Claim. (Cl. 97—72)

My invention relates to a new and useful improvement in a plow control adapted for use primarily on tractors and the like which are designed to pull a plow. While the invention is illustrated as used with a plow and the description relates to this particular adaptation of the invention, it will appear obvious that the invention may also be used on other types of instruments such as cultivators, discs and the like. When a plow is drawn by a tractor the man operating the tractor is sitting in a position considerably forwardly of the plow. It is necessary that the plow be raised and lowered at periodic intervals and particularly when the end of a furrow is reached and a turn is to be made. As the tractor reaches the end of a furrow the plow is raised and remains in raised position until the turn has been made and the return trip is ready to start. With present types of constructions the operator uses a lever to pull on a draw bar which actuates a tripping mechanism which will serve to raise the plow and retain it in raised position until the turn has been made. Upon releasing the tripping mechanism the plow may be permitted to again lower itself to operative position. When the present types of constructions much difficulty has been encountered particularly when the operator is making a turn at the end of a furrow. In making the turn the operator should have the use of both of his hands to control the steering of the tractor. Instead the operator is forced to pull a lever to affect an actuation of the tripping mechanism through the draw bar. This is an unsatisfactory condition particularly as to safety and efficiency in operation. With such a mechanism it has also been shown that the plow is not always lowered at the same location as the driver being busy with the control of the vehicle sometimes omits to lower or raise the plow at the proper position.

It is an object of the present invention to avoid these difficulties and provide a plow control mechanism having many additional advantages.

Another object of the invention is the provision of a plow control mechanism electrically operated so that the operator by closing a circuit may actuate a tripping mechanism and either lower or raise the plow at will.

Another object of the invention is the provision of a plow raising and lowering mechanism which may be actuated by the operator without interfering to any great extent with the operator's control of the vehicle.

Another object of the invention is the provision of a plow raising and lowering mechanism which may be operated upon the actuation of a switch which may be hand-operated or foot-operated as desired.

Another object of the invention is the provision of a plow control mechanism so constructed and arranged that when applied to a tractor the plow or other instrument may be raised and lowered at the same position on adjacent rows thus adding to the efficiency of the mechanism as a whole and providing a means for ending the rows which are plowed at substantially the same place regardless of the number of rows which have to be plowed.

Other objects will appear hereinafter.

It is recognized that various modifications and changes may be made in the detail of structure illustrated and it is intended that such variations and modifications as do not depart from the invention shall be embraced within the scope of the claims which form a part hereof. Forming a part of this application are drawings in which, Fig. 1, is a top plan view of plow-carrying frame showing the invention applied, Fig. 2, is a side elevational view showing the invention applied with parts broken away, Fig. 3, is a fragmentary side elevational view with parts shown in section and parts broken away, showing the mechanism in the raised position contrast to the lowered position showing the mechanism in the lowered position in contrast to the raised position shown in Fig. 2, Fig. 4 is a fragmentary side elevational detail view with parts broken away and parts shown in section slightly enlarged, Fig. 5, is a slightly enlarged fragmentary elevational view showing parts broken away and parts in section, Fig. 6, is an enlarged sectional view taken on line 6—6 of Fig. 4, Fig. 7, is a view taken on line 7—7 of Fig. 4, Fig. 8, is a fragmentary sectional view slightly enlarged taken on line 8—8 of Fig 7, Fig. 9, is a fragmentary sectional view taken on line 9—9 of Fig. 4, Fig. 10, is a diagrammatic view illustrating the wiring used in the invention.

In the drawings I have indicated a supporting frame embodying the oppositely disposed side rails 17 and 18 connected together by the cross bars 19 and 19A. Connected to this frame and extending forwardly thereof is a draw bar 20 which may be attached to a tractor or other suitable means for pulling the frame. A bar 21 is secured to the frame 18 and diagonally directed toward and into engagement with the rail 22. The frame is illustrated in detail sufficiently to show the invention and the mounting of a single plow. Some of these frames are used to drag several plows but the invention will be fully understood by indicating the attachment of a single plow.

Mounted on the rail 18 is the supporting hub 23 in which the shaft 24 projecting upwardly from the furrow or advance plow 25 may be secured.

The rail 18 is angularly turned as at 26 and attached to the lower end of this angularly turned portion 26 is a plow 27. Secured to and projecting downwardly from the rails 17 and 18 are supporting lugs 40 and 39 respectively through which is extended the shaft 28 having the angularly turned portion 29 and the crank portion 30 on which is rotatably mounted a traction wheel 31. Projected through supporting lugs 41 which project upwardly from the rails 17 and 18 is a shaft 32 having the angularly turned portion 33 and the crank 34 on which is rotatably mounted a traction wheel 35. Secured to and rotating in unison with the traction wheel 35 is a pair of spaced-apart discs 36 and 37 connected together by the studs or pins 38.

Secured to the rails 17 and 18 are the upwardly projecting bars 43 and 44 which connect to a sleeve 45 through which is extended a rod 46. These bars 43 and 44 and the sleeve 45 as well as the rod 46 form no part of the present invention.

Fixedly connected at its lower end to the shaft 32 is a lever 47 to which is pivotally connected one end of the bar 48 in which is formed a notch 49.

Pivotally mounted on the rail 18 is a lever 50 carrying a dog 51 adapted to engage the teeth of the toothed segment 52 which is fixedly mounted on the rail 18. A rod 54 is pivotally connected at one end to the lug 53 which is carried by the lever 50. The opposite end of this rod 54 is connected to one end of the arm 55 which is pivotally connected to end of a link 56 the opposite end of which is fixedly connected to the shaft 28. The rod 57 is connected at one end to the link 55 and threaded at its opposite ends through a nut 59 mounted on the arm 58 which is fixedly mounted on the shaft 32.

These shafts 32 and 28 are rockably mounted so that the frame may be said to be floatingly mounted on the shafts or axles 28 and 32. When these shafts 28 and 32 are rocked in such a manner as to move the cranks or angularly turned portions 29 and 33 downwardly it is obvious that the frame will be elevated. When the shafts are rocked in the opposite direction the frame may be lowered. By connecting these shafts 28 and 32 together by means of the arms 58, nut 59, the rod 57 the link 55 and the arm 56 as well as the rod 54, the rocking of the shafts 28 and 32 may be controlled and effected. By rocking the lever 50 the relative location of the traction wheels 31 and 35 may be varied thus making it possible to equalize the frame as to the horizontal when one of the wheels is traveling in a furrow and the other is not.

Mounted on and projecting upwardly from the rail 18 is a lug 60 which serves as a bearing for the shaft 65. Secured to and projecting upwardly from the rail 17 is a supporting standard 63 carrying the hub 64 and a pair of spaced-apart arms or plates 61 and 62, the shaft 65 projecting through and being journaled on the hub 64. Fixedly mounted on the shaft 65 is a detent or locking link 6 having a recess 67 formed in one of its ends to provide an abutment shoulder against which may engage the nose of a dog 68 pivotally mounted on the arm or plate 61 and normally held by the spring 91 pressed downwardly for engaging in the recess 67. An arm 70 is pivotally mounted by means of the pin 75 between the arms or plates 61 and 62. This arm 70 carries at its lower end a releasing arm or dog 72 which is pivotally mounted on the arm 70 by means of the pin 71 and which is provided at one end with a releasing nose 73 and at the opposite end with an outward projection or heel 74. A rocker arm 75 is pivotally mounted on the arm 70 by means of the pin 76. This arm 75 carries at its lower end a roller 77. Connected at one end of the arm 75 is a spring 79, the other end of which is connected to a lug 78 projecting outwardly from the arm 62. Projecting through the arms or plates 61 and 62 is a pin 49A which is adapted to be received in the notch or recess 49 formed in the bar 48.

Fixedly mounted on the bar 48 is a nut 83 through which slidably projects the rod 80 one end of which is pivotally connected to the member 66. Fixedly mounted on this rod 80 is an abutment block 81 against which is adapted to bear one end of the spring 82 which embraces the rod 80 and which is positioned between the members 81 and 83.

Projecting outwardly from the arms 61 and 62 is a supporting bracket 84 which serves to support a solenoid coil 85 which is provided with a slidable plunger 86 which is threaded through the nut 87 which carries the stem 88 projected through a slot formed in the arm 70, as shown in Fig. 3 and in Fig. 9.

Fixedly mounted on the shaft 65 is the elevating arm 89 having the spaced-apart teeth 90 projecting downwardly from the inner face thereof.

In Fig. 2, I have indicated the mechanism with the plow raised to inoperative position and in Fig. 3, the mechanism is illustrated in that position in which the plow is operative or plowing position.

When the driver of the vehicle desires to lower the plow from inoperative position as shown in Fig. 2, to operative position as shown in Fig. 3, the driver would close the switch 93 thus closing the circuit from the battery 91a to the solenoid 85, this solenoid 85 being grounded at 94 and the battery being grounded at 92. When the solenoid is energized the plunger 86 will be forced outwardly or to the right of Fig. 2, thus rocking the arm 70 to the right at the upper end against the tension of the spring 95 and against the tension of the spring 79. This rocking movement will rock the lower end of the arm 70 to the left of the drawing so that the roller 77 (see Fig. 7) is moved to the left sufficiently to allow the bar 48 to rise upwardly so that the notch or recess 49 disengages from the pin 49A. When this disengagement takes place the bar 48 may move to the left of Fig. 2, permitting the lever or arm 47 to swing to the left and thus permitting the axles or shafts 32 and 28 to rock on the axis of the end of the angularly turned portions 33 and 34 which will cause the frame to lower so that the plow 27 is lowered to the desired position and the various parts will have moved into the position shown in Fig. 3, the spring 95 returning the arm 70 to the full line position, the roller bearing arm 75 cannot return to the position shown in Fig. 2 or Fig. 4 because the heel 74 will be in engagement with the roller 77 thus resisting an attempt of the arm 75 to return to the position shown in Fig. 4 in response to the tension of the spring 79.

When it is desired to raise the plow from operative position shown in Fig. 3, to inoperative position shown in Fig. 2, the switch would again be closed and the solenoid energized to thrust the plunger 86 to the right of the drawing thus rocking the arm 70 to the dotted line position shown in Fig. 3. As the arm 70 rocks to the right at its top and to the left at its bottom it will draw the dog 72 so that the nose 73 will engage the dog 68 and rock it out of engagement with the recess 67. This will permit the shaft 65 to rock in response to the weight of the member 89 and this member will drop downwardly into the position shown in Fig. 5, so that the teeth 90 may be engaged by the pins 38. The discs 36 and 37 which carry these pins will be rotating in unison with the traction wheel 35. An examination of Fig. 3 will indicate that when the plow is lowered to operative position the crank 33 of the shaft will have moved closer to approach the horizontal position. Consequently when the traction wheel 35 is rotated while the teeth 90 are engaged by the pins 38 a rearward thrust will be delivered to the crank 33 of the shaft tending to move it downwardly at its upper end toward the vertical. This of course will effect a rocking of the shaft 32 and longitudinal movement of the bar 48. This longitudinal movement will continue against the compression of the spring 82 until the notch 49 drops downwardly over the pin 49A. When this is accomplished the arm 75 will move in response to the tension of the spring 79 so that the roller will be positioned as shown in Fig. 4 and serve as an abutment for preventing upward movement of the arm 48. As the roller 77 moves into the position shown in Fig. 4, through engagement with the heel 74, the arm 72 will be rocked upwardly so that on the next rearward or swinging movement when the arm 70 is moved by the plunger 86 the nose 73 will clear the dog 68.

As the pins are rotated to the right of Fig. 5 and the arm 89 is raised upwardly the arm 66 will be rocked to the right drawing with it the rod 80. The member 83 engaging one end of the spring 82 will carry this spring 82 until it engages at its opposite end with the stationary abutment member and then after the movement continues the spring 82 will be placed under compression. The compression of this spring will be sufficient so that when the pins 38 finally clear the teeth 90 on the arm 89 the shaft 65 will be rocked quickly to the right in response to the compression of the spring 82 thus snapping the arm 89 and the arm 66 into the position shown in Fig. 2.

With this mechanism therefore, the plow or other implement may be raised and lowered by the operator of the vehicle simply by closing a switch. This permits the operator of the vehicle to keep both hands on the steering wheel of the vehicle and properly control its operation as the switch may be placed in a convenient place on the steering wheel where it may be flicked to closed position by the finger without removing the hand from the steering wheel. The switch will be of course of the spring actuated type so that when it is pressed inwardly the switch will be closed and the release of the pressure will permit the switch to move to open position. The switch might also be placed in such a position that the operator could operate it by his foot, arm or other movable part of the body.

This way I have provided a simple and effective means for controlling the raising and lowering of the plow in which the various advantages enumerated are obtained and the disadvantages referred to are avoided.

What I claim as new is:

In a device of the class described, a supporting frame adapted for supporting a ground working implement and movable to operative and inoperative position; a raising mechanism for raising said frame from operative to inoperative position; a latch mechanism for retaining said raising mechanism in inoperative position; a pair of spaced apart plates mounted on and projecting upwardly from said frame; an arm pivotally mounted on and adapted for movement between said plates; a swingably mounted latch releasing dog on said arm and adapted upon movement of said arm in one direction for releasing said latching mechanism; a bracket mounted on and projecting outwardly from the upper end of said plates; a solenoid mounted on said bracket; and a slidable plunger in said solenoid adapted upon energizing of said solenoid for moving said arm in said direction; means for preventing movement of said frame from inoperative to operative position and embodying a longitudinally, movable notch-bearing bar; an engagement member engageable in the notch in said bar for preventing longitudinal movement of the same and retaining said frame in inoperative position; a roller bearing arm mounted on said first named arm and lying between said plates; a roller on the lower end of said roller bearing arm engageable with the upper face of said bar for normally retaining said engagement member in said notch; a heel on said dog engageable with said roller and adapted upon movement of said first named arm in said direction for moving said roller bearing arm to inoperative position for permitting dis-engagement of said notch with said engagement member and retaining said roller bearing arm rocked to inoperative position for preventing binding of said roller with said bar.

BENJAMIN D. STEVENSON.

REFERENCES CITED

The following references are of record in the file of this patent:

UNITED STATES PATENTS

| Number | Name | Date |
|---|---|---|
| 2,253,419 | Cunningham | Aug. 19, 1941 |
| 2,286,359 | Gemberling | June 16, 1942 |
| 2,359,600 | Altgelt | Oct. 3, 1944 |